US012810833B2

(12) United States Patent
Kobayashi et al.

(10) Patent No.: US 12,810,833 B2
(45) Date of Patent: Nov. 24, 2026

(54) SOUNDPROOFING COVER

(71) Applicant: KABUSHIKI KAISHA TOYOTA JIDOSHOKKI, Aichi (JP)

(72) Inventors: Toshiyuki Kobayashi, Aichi (JP); Noritaka Nishimori, Aichi (JP); Masaaki Matsushita, Aichi (JP); Toshiharu Awa, Aichi (JP); Ryuji Watanabe, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 309 days.

(21) Appl. No.: 18/616,398

(22) Filed: Mar. 26, 2024

(65) Prior Publication Data

US 2024/0331675 A1 Oct. 3, 2024

(30) Foreign Application Priority Data

Mar. 30, 2023 (JP) ................................ 2023-055991
Mar. 1, 2024 (JP) ................................ 2024-031423

(51) Int. Cl.
*G10K 11/16* (2006.01)
*B65D 43/16* (2006.01)
(Continued)

(52) U.S. Cl.
CPC ............ *G10K 11/16* (2013.01); *B65D 43/161* (2013.01); *B65D 43/22* (2013.01); *B65D 51/24* (2013.01);
(Continued)

(58) Field of Classification Search
CPC ...... B65D 43/161; B65D 43/22; B65D 45/16; B65D 45/18; B65D 50/046; F16B 5/06; G10K 11/16
(Continued)

(56) References Cited

U.S. PATENT DOCUMENTS 5,577,779 A * 11/1996 Dangel .................. E05C 19/06
220/326
5,588,810 A * 12/1996 DiFlora .............. F04B 39/0033
181/403
(Continued)

FOREIGN PATENT DOCUMENTS

JP 2013-194673 9/2013
JP 2021-170086 10/2021
(Continued)

*Primary Examiner* — Jeremy A Luks
(74) *Attorney, Agent, or Firm* — Greenblum & Bernstein, P.L.C.

(57) ABSTRACT

A soundproofing cover includes a cover body, a hook portion a hook hole, and a hook protrusion protruding from an outer surface of the cover body. The cover body is maintained in a closed state with the hook portion hooked on the hook protrusion. The hook protrusion includes a protrusion body protruding from the outer surface of the cover body, a first engaging protrusion protruding from a distal end of the protrusion body toward a tip end of the hook portion in an extending direction of the hook portion with the hook portion hooked on the hook protrusion, and a second engaging protrusion protruding from the distal end of the protrusion body in a direction opposite to the tip end of the hook portion in the extending direction with the hook portion hooked on the hook protrusion.

7 Claims, 5 Drawing Sheets

(51) Int. Cl.
*B65D 43/22* (2006.01)
*B65D 51/24* (2006.01)

(52) U.S. Cl.
CPC .............. *B65D 2543/00194* (2013.01); *B65D 2543/00351* (2013.01)

(58) Field of Classification Search
USPC .......................................... 181/200, 201, 282
See application file for complete search history.

(56) References Cited

U.S. PATENT DOCUMENTS

| | | | | |
|---|---|---|---|---|
| 2022/0085688 | A1* | 3/2022 | Riederer | B32B 27/32 |
| 2024/0331676 | A1* | 10/2024 | Kobayashi | B65D 51/24 |

FOREIGN PATENT DOCUMENTS

| | | | | |
|---|---|---|---|---|
| JP | 2022-169191 | | | 11/2022 |
| JP | 2022169192 | A | * | 11/2022 |
| JP | 2023014710 | A | * | 1/2023 |
| JP | 2023044933 | A | * | 4/2023 |
| JP | 7297387 | B2 | * | 6/2023 |

* cited by examiner

SOUNDPROOFING COVER

CROSS-REFERENCE TO RELATED APPLICATION

This application claims priority to Japanese Patent Applications No. 2023-055991 filed on Mar. 30, 2023, and No. 2024-031423 filed on Mar. 1, 2024, the entire disclosure of which is incorporated herein by reference.

BACKGROUND ART

The present invention relates to a soundproofing cover.

For example, Japanese Patent Application Publication No. 2022-169191 discloses a soundproofing cover that includes a cover body. The cover body is configured to be opened and closed. The soundproofing cover includes a hook portion and a hook protrusion. The hook portion extends from the cover body. The hook portion defines a hook hole. The hook protrusion protrudes from an outer surface of the cover body and the hook protrusion is inserted into the hook hole when the cover body is in a closed state, so that the hook portion is hooked on the hook protrusion. In this way, the cover body is maintained in a closed state with the hook portion hooked on the hook protrusion.

In such a soundproofing cover, in order to improve the reliability of the soundproofing cover, it is desired to make it difficult for the hook portion to come off from the hook protrusion.

SUMMARY

In accordance with an aspect of the present disclosure, there is provided a soundproofing cover including a cover body configured to be opened and closed, a hook portion extending from the cover body and defining a hook hole, and a hook protrusion protruding from an outer surface of the cover body when the cover body is in a closed state, and on which the hook portion is hooked with the hook protrusion inserted into the hook hole. The cover body is maintained in the closed state with the hook portion hooked on the hook protrusion. The hook protrusion includes a protrusion body protruding from the outer surface of the cover body, a first engaging protrusion protruding from a distal end of the protrusion body toward a tip of the hook portion in an extending direction of the hook portion with the hook portion hooked on the hook protrusion, and a second engaging protrusion protruding from the distal end of the protrusion body in a direction opposite to the tip of the hook portion in the extending direction with the hook portion hooked on the hook protrusion.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe a soundproofing cover according to an embodiment with reference to FIGS. 1 to 6. The soundproofing cover of the present embodiment is attached to a compressor including a housing having a cylindrical shape. Therefore, an attaching target to which the soundproofing cover of the present embodiment is attached is the compressor.

Overall Configuration of Soundproofing Cover

Figure 1:
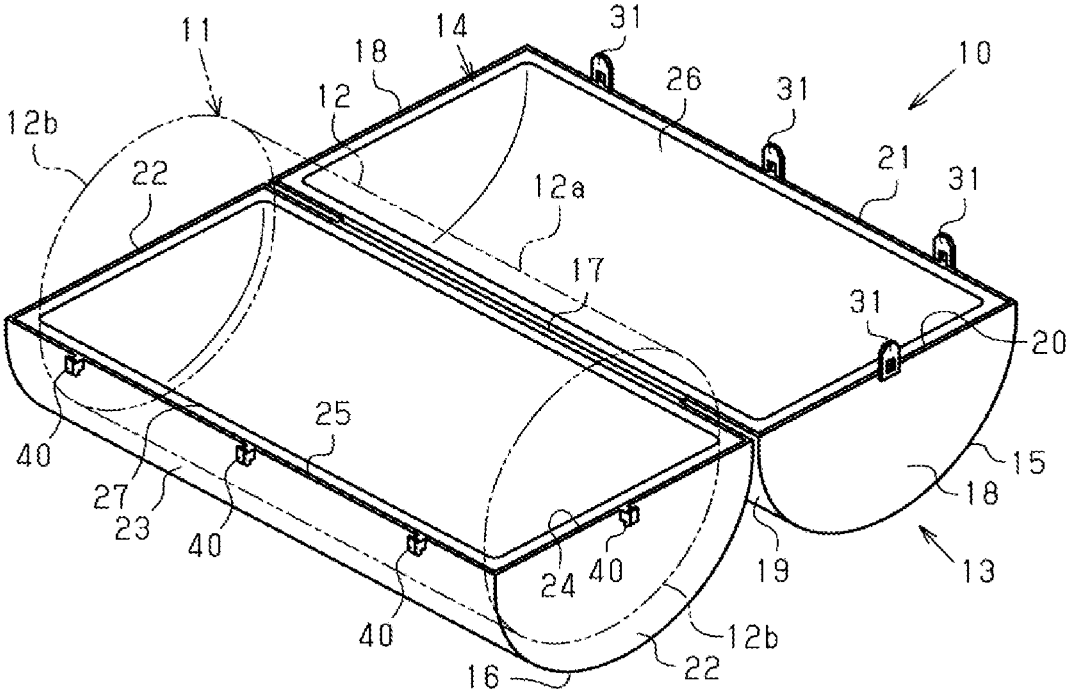
FIG. 1 is a perspective view illustrating a cover body in an open state according to an embodiment.
Figure 2:
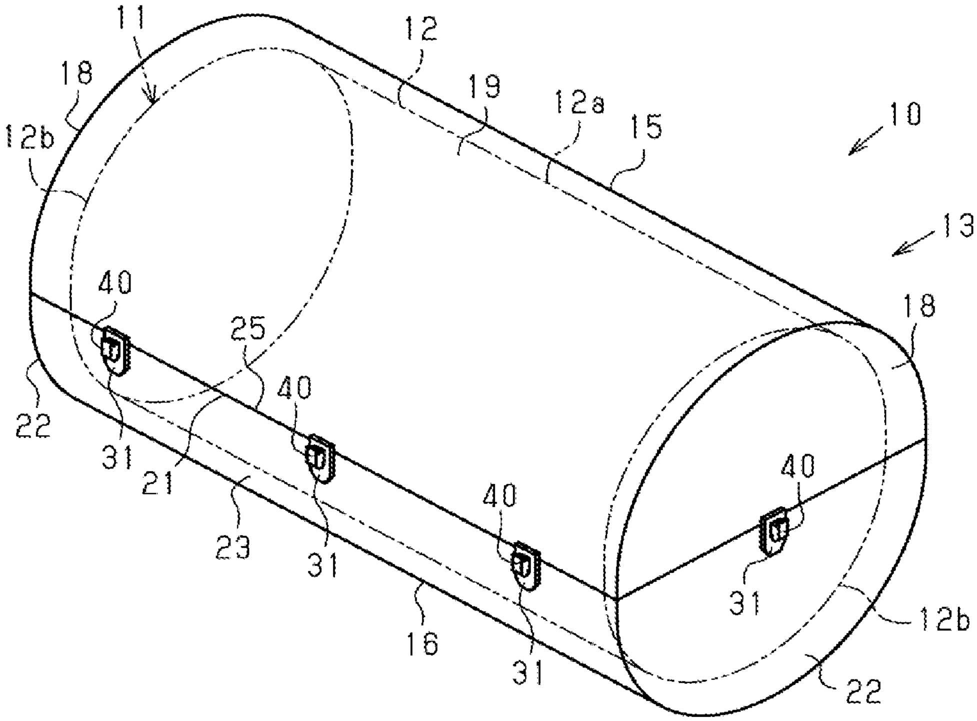
FIG. 2 is a perspective view illustrating the cover body in a closed state.

As illustrated in FIGS. 1 and 2, a soundproofing cover 10 is configured to cover a housing 12 of a compressor 11 entirely. The soundproofing cover 10 includes a cover body 13 and a sound absorber 14.

Cover Body

The cover body 13 is configured to be opened and closed. For example, a synthetic resin such as polypropylene, polyamide, ABS resin, and olefin elastomer is used as a material for the cover body 13. The cover body 13 is made of a material with excellent sound insulation properties. The cover body 13 has flexibility.

The cover body 13 includes a first cover forming member 15, a second cover forming member 16, and a hinge 17. The first cover forming member 15 has a semicylindrical shape. The first cover forming member 15 has a pair of first end walls 18 each having a semicircular disk shape and a first peripheral wall 19 having a semicylindrical shape. The first peripheral wall 19 connects the pair of first end walls 18 to each other. A first accommodation recess 20 is defined by the first peripheral wall 19 and the pair of first end walls 18. The edges of the first peripheral wall 19 and the edges of the first end walls 18 form a first opening edge 21 of the first cover forming member 15. The first opening edge 21 of the first cover forming member 15 forms an opening of the first accommodation recess 20. The first opening edge 21 of the first cover forming member 15 is a cover edge that corresponds to the opening edge of the cover body 13 when the cover body 13 is in an opened state. Thus, the cover body 13 has the first opening edge 21 corresponding to the cover edge.

When the cover body 13 is in a closed state, the first accommodation recess 20 accommodates a portion of the housing 12 of the compressor 11. The first cover forming member 15 is disposed relative to the housing 12 of the compressor 11 so that the first peripheral wall 19 covers a portion of the peripheral wall 12*a* of the housing 12 of the compressor 11, and the first end walls 18 covers portions of end walls 12*b* of the housing 12. The first peripheral wall 19 of the first cover forming member 15 extends along a circumferential direction of the housing 12 of the compressor 11.

A second cover forming member 16 has a semicylindrical shape. The second cover forming member 16 has a pair of second end walls 22 each having a semicircular disk shape and a second peripheral wall 23 having a semicylindrical shape. The second peripheral wall 23 connects the pair of second end walls 22 to each other. A second accommodation recess 24 is defined by the second peripheral wall 23 and the pair of second end walls 22. The edges of the second peripheral wall 23 and the edges of the second end walls 22 form a second opening edge 25 of the second cover forming member 16. The second opening edge 25 of the second cover forming member 16 forms an opening of the second accommodation recess 24. The second opening edge 25 of the second cover forming member 16 is a cover edge that corresponds to the opening edge of the cover body 13 when the cover body 13 is opened. Thus, the cover body 13 has the second opening edge 25 corresponding to the cover edge.

When the cover body 13 is in the closed state, the second accommodation recess 24 accommodates a remaining portion of the housing 12 of the compressor 11 that is not accommodated by the first accommodation recess 20. The second cover forming member 16 is disposed relative to the housing 12 of the compressor 11 so that the second peripheral wall 23 covers a remaining portion of the peripheral wall 12*a* of the housing 12 of the compressor 11 that is not covered by the first peripheral wall 19 of the first cover forming member 15. Thus, the second peripheral wall 23 of the second cover forming member 16 extends along the circumferential direction of the housing 12 of the compressor 11. The second cover forming member 16 is disposed relative to the housing 12 of the compressor 11 so that the second end walls 22 cover remaining portions of the end walls 12*b* of the housing 12 that are not covered by the first end walls 18 of the first cover forming member 15.

The hinge 17 connects the first cover forming member 15 and the second cover forming member 16. The hinge 17 connects one of the edges of the first peripheral wall 19 and one of the edges of the second peripheral wall 23. The hinge 17 is an integral hinge that is formed integrally with the first peripheral wall 19 of the first cover forming member 15 and the second peripheral wall 23 of the second cover forming member 16. Therefore, the hinge 17 is made of the same material as that of the cover body 13.

The hinge 17 is configured to allow the first cover forming member 15 and the second cover forming member 16 to rotate in directions in which the first opening edge 21 of the first cover forming member 15 and the second opening edge 25 of the second cover forming member 16 approach and separates from each other with the hinge 17 as a rotation center. The cover body 13 is brought into the closed state when the first opening edge 21 of the first cover forming member 15 and the second opening edge 25 of the second cover forming member 16 abut against each other. The cover body 13 covers the compressor 11 when the cover body 13 is in the closed state. The first cover forming member 15 forms the first opening edge 21 that is a mating cover edge abut to the second opening edge 25 of the second cover forming member 16.

Sound Absorber

The sound absorber 14 is disposed inside the cover body 13. Thus, the sound absorber 14 is a part that is disposed inside the cover body 13. The sound absorber 14 is disposed between the cover body 13 and the housing 12 of the compressor 11. The sound absorber 14 is configured to cover the housing 12 of the compressor 11 entirely. Examples of a material of the sound absorber 14 include urethane and nonwoven fabric. The sound absorber 14 is made of a material with excellent sound absorbing properties. The sound absorber 14 is elastically deformable.

The sound absorber 14 includes a first sound absorber forming member 26 and a second sound absorber forming member 27. The first sound absorber forming member 26 is disposed inside the first cover forming member 15. The first sound absorber forming member 26 extends along an inner surface of the first peripheral wall 19 and inner surfaces of the first end walls 18. The first sound absorber forming member 26 covers the entire inner surface of the first peripheral wall 19 and the entire inner surfaces of the first end walls 18. The first sound absorber forming member 26 is in close contact with the inner surface of the first peripheral wall 19 and the inner surfaces of the first end walls 18. A thickness of the first sound absorber forming member 26 in an original shape before the first sound absorber forming member 26 is elastically deformed is greater than a thickness of the first cover forming member 15.

The second sound absorber forming member 27 is disposed inside the second cover forming member 16. The second sound absorber forming member 27 extends along an inner surface of the second peripheral wall 23 and inner surfaces of the second end walls 22. The second sound absorber forming member 27 covers the entire inner surface of the second peripheral wall 23 and the entire inner surfaces of the second end walls 22. The second sound absorber forming member 27 is in close contact with the inner surface of the second peripheral wall 23 and the inner surfaces of the second end walls 22. Thus, the sound absorber 14 is in close contact with the inner surface of the cover body 13. A thickness of the second sound absorber forming member 27 in an original shape before the second sound absorber forming member 27 is elastically deformed is greater than a thickness of the second cover forming member 16.

Hook Portion

The soundproofing cover 10 includes a plurality of hook portions 31. The hook portions 31 are formed in the first cover forming member 15. The hook portions 31 are disposed in the other of the edges of the first peripheral wall 19 of the first cover forming member 15 different from the one of the edges of the first peripheral wall 19 to which the hinge 17 is connected, and the edge of one of the first end walls 18. The hook portions 31 each extend out from the outer surface of the first cover forming member 15 by a predetermined length beyond the first opening edge 21 of the first cover forming member 15. Thus, the hook portions 31 extend from the cover body 13. The hook portions 31 are formed integrally with the first cover forming member 15. Thus, the hook portions 31 are made of the same material as that of the cover body 13.

Figure 3:
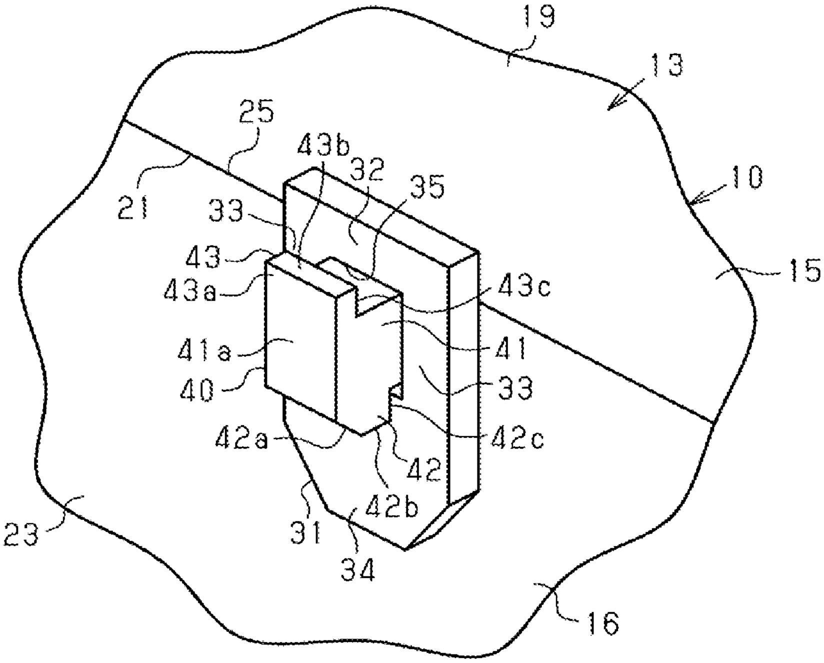
FIG. 3 is a perspective view illustrating a relationship between a hook portion and a hook protrusion.
Figure 4:
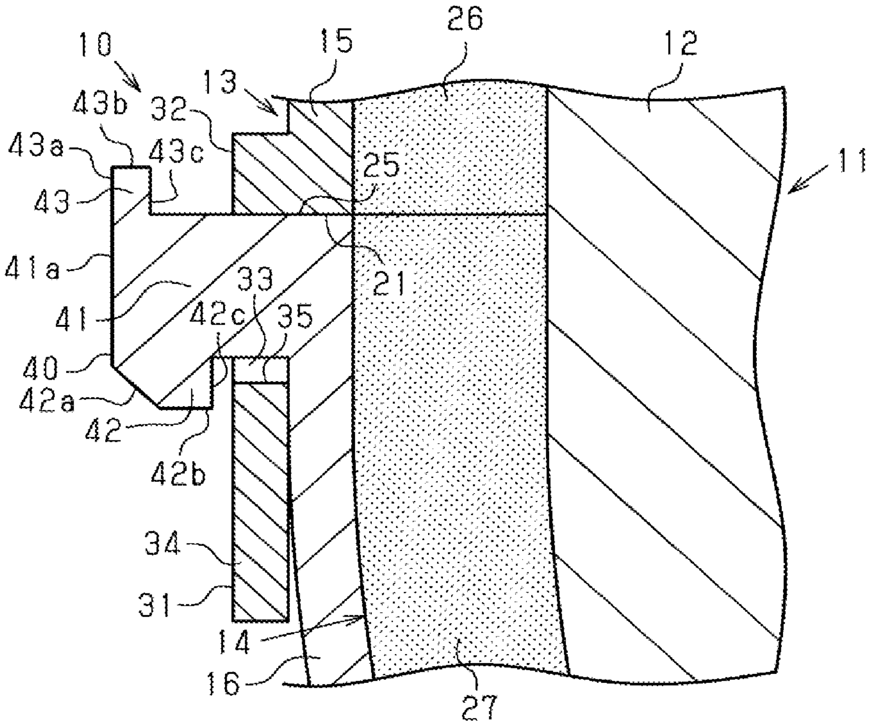
FIG. 4 is a cross-sectional view illustrating a relationship between the hook portion and the hook protrusion.

As illustrated in FIG. 3, the hook portions 31 each have a thin flat plate shape. The hook portions 31 each include a joining portion 32, a pair of connecting portions 33, and a grip portion 34. As illustrated in FIGS. 3 and 4, the joining portion 32 is joined to the outer surface of the first cover forming member 15. The joining portion 32 has an elongated plate shape. A longitudinal direction of the joining portion 32 coincides with an extending direction of the first opening edge 21 of the first cover forming member 15. A surface of the joining portion 32 on a side of the first opening edge 21 of the first cover forming member 15 is flush with the first opening edge 21.

The pair of connecting portions 33 extends out by a predetermined length from opposite ends of the joining portion 32 in the longitudinal direction. The connecting portions 33 extend parallel to each other. The grip portion 34 connects ends of the connecting portions 33 opposite from the joining portion 32 to each other. The grip portion 34 has a tongue shape. The grip portion 34 forms a tip end portion of each of the hook portions 31 in an extending direction thereof from the outer surface of the first cover forming member 15. Thus, an end of the grip portion 34 opposite from the connecting portions 33 is a tip of each of the hook portions 31 in the extending direction.

The joining portion 32, the pair of connecting portions 33, and the grip portion 34 form a hook hole 35. Thus, each of the hook portions 31 forms the hook hole 35. The hook hole 35 has a square hole shape. The joining portion 32 is a portion forming a part of the hook hole 35 opposite to the tip of each of the hook portions 31 in the soundproofing cover 10.

Hook Protrusion

As illustrated in FIGS. 1 and 2, the soundproofing cover 10 includes a plurality of hook protrusions 40. The hook protrusions 40 are formed in the second cover forming member 16. The hook protrusions 40 are disposed in the other of the edges of the second peripheral wall 23 of the second cover forming member 16 different from the one of the edges of the second peripheral wall 23 to which the hinge 17 is connected, and an edge of one of the second end walls 22. The hook protrusions 40 protrude from the outer surface of the cover body 13 at positions corresponding to the hook portions 31 when the cover body 13 is in the closed state. The hook protrusions 40 are formed integrally with the second cover forming member 16. Thus, the hook protrusions 40 are made of the same material as that of the cover body 13.

As illustrated in FIGS. 3 and 4, the hook protrusions 40 each include a protrusion body 41, a first engaging protrusion 42, and a second engaging protrusion 43. The protrusion body 41 protrudes out from the outer surface of the second cover forming member 16. Thus, the protrusion body 41 protrudes from the outer surface of the cover body 13. The protrusion body 41 has a quadrangular column shape. The protrusion body 41 protrudes from a portion of the outer surface of the second cover forming member 16 continuous with the second opening edge 25. The protrusion body 41 has a distal end surface 41*a* that is positioned at a distal end of the protrusion body 41 in a protruding direction and is a flat surface.

The first engaging protrusion 42 protrudes from a distal end of the protrusion body 41 in a direction opposite from the second opening edge 25 of the second cover forming member 16. The first engaging protrusion 42 has an inclined surface 42*a*, a first protrusion end surface 42*b*, and a first engaging surface 42*c*. The inclined surface 42*a* is continuous with the distal end surface 41*a* of the protrusion body 41. The inclined surface 42*a* approaches the outer surface of the second cover forming member 16 as away from the distal end surface 41*a* of the protrusion body 41. The first protrusion end surface 42*b* is continuous with an end of the inclined surface 42*a* opposite from the distal end surface 41*a* of the protrusion body 41. The first protrusion end surface 42*b* is a flat surface. The first protrusion end surface 42*b* extends parallel to the protrusion body 41.

The first engaging surface 42*c* is a surface of the first engaging protrusion 42 positioned on a side of a proximal end of the protrusion body 41. The first engaging surface 42*c* connects an end of the first protrusion end surface 42*b* opposite from the inclined surface 42*a* and the protrusion body 41. The first engaging surface 42*c* is a flat surface.

The second engaging protrusion 43 protrudes from the distal end of the protrusion body 41 in a direction opposite to the first engaging protrusion 42. The second engaging protrusion 43 has a flat surface 43*a*, a second protrusion end surface 43*b*, and a second engaging surface 43*c*. The flat surface 43*a* is continuous with the distal end surface 41*a* of the protrusion body 41. The flat surface 43*a* is flush with the distal end surface 41*a* of the protrusion body 41. The second protrusion end surface 43*b* is continuous with an end of the flat surface 43*a* opposite from the distal end surface 41*a* of the protrusion body 41. The second protrusion end surface 43*b* is a flat surface. The second protrusion end surface 43*b* extends parallel to the protrusion body 41.

The second engaging surface 43*c* is a surface of the second engaging protrusion 43 positioned on a side of the proximal end of the protrusion body 41. The second engaging surface 43*c* connects an end of the second protrusion end surface 43*b* opposite from the flat surface 43*a* and the protrusion body 41. The second engaging surface 43*c* is a flat surface. The second engaging surface 43*c* is disposed at a position farther from the proximal end of the protrusion body 41 than the first engaging surface 42*c*.

Each of the hook portions 31 is hooked on its associated one of the hook protrusions 40 with each of the hook protrusions 40 inserted into the hook hole 35. As illustrated in FIG. 2, the cover body 13 is maintained in the closed state with each of the hook portions 31 hooked on its associated one of the hook protrusions 40. As illustrated in FIGS. 3 and 4, in a state where each of the hook portions 31 is hooked on its associated one of the hook protrusions 40, the first engaging protrusion 42 protrudes from the distal end of the protrusion body 41 toward the tip of its associated one of the hook portions 31 in the extending direction. In the state where each of the hook portions 31 is hooked on its associated one of the hook protrusions 40, the second engaging protrusion 43 protrudes from the distal end of the protrusion body 41 in a direction opposite to the tip of its associated one of the hook portions 31 in the extending direction.

Figure 5:
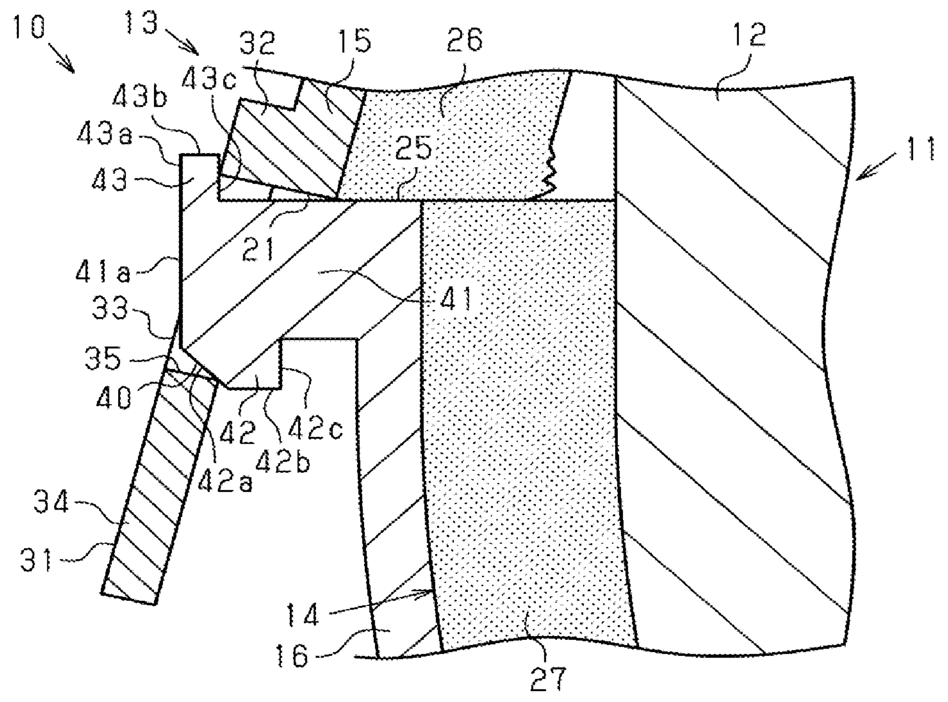
FIG. 5 is a cross-sectional view illustrating a state in which the hook portion is being hooked on the hook protrusion.

As illustrated in FIG. 5, for example, in hooking each of the hook portions 31 on its associated one of the hook protrusions 40, the joining portion 32 is hooked on the second engaging surface 43*c* of the second engaging protrusion 43 and, then, each of the hook protrusions 40 is inserted to the hook hole 35. At this time, each of the hook protrusions 40 is inserted into the hook hole 35 while the grip portion 34 of each of the hook portions 31 is being pulled. The inclined surface 42*a* of the first engaging protrusion 42 lessens interference between the grip portion 34 and the first engaging protrusion 42 when each of the hook protrusions 40 is inserted into the hook hole 35 while the grip portion 34 of each of the hook portions 31 is being pulled. The tip portion of each of the hook portions 31 is disposed between the first engaging surface 42*c* of the first engaging protrusion 42 and the outer surface of the second cover forming member 16. In this way, each of the hook portions 31 is hooked on its associated one of the hook protrusions 40.

Operation of Embodiment

The following will describe an operation of the embodiment.

Sound generated by driving the compressor 11 is radiated from the housing 12. At this time, the sound radiated from the housing 12 is absorbed by the sound absorber 14 of the soundproofing cover 10. In addition, the cover body 13 blocks the radiated sound having passed through the sound absorber 14. This suppresses radiation of sound radiated from the housing 12 to the outside of the soundproofing cover 10.

For example, in the state where each of the hook portions 31 is hooked on its associated one of the hook protrusions 40, the tip portion of each of the hook portions 31 may move in a direction away from the outer surface of the cover body 13. Even in this case, the first engaging protrusion 42 is engaged with the tip portion of each of the hook portions 31. In this way, coming off of the hook portions 31 from the hook protrusions 40 may be avoided. As a result, it is difficult for each of the hook portions 31 to come off from its associated one of the hook protrusions 40.

Figure 6:
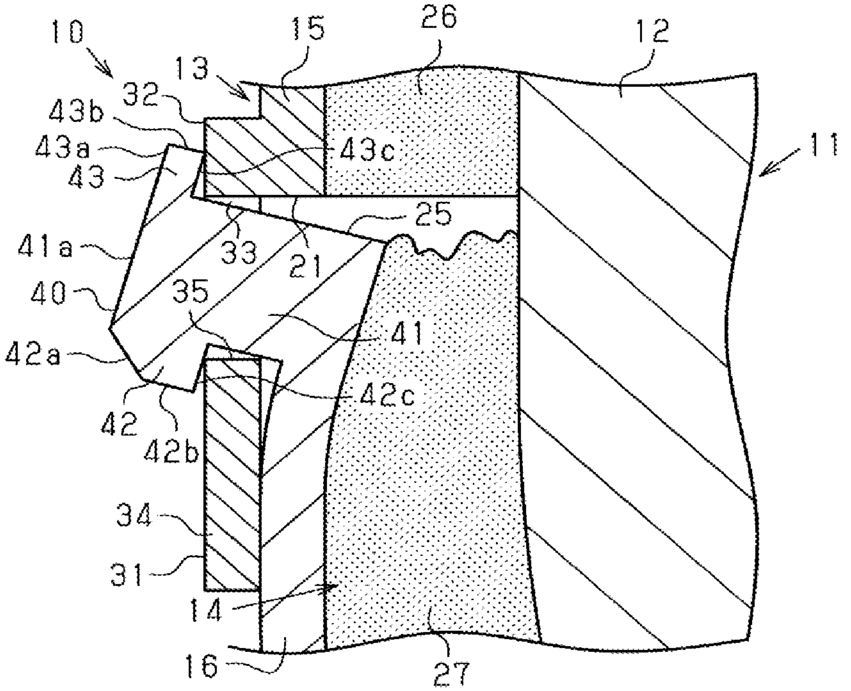
FIG. 6 is a cross-sectional view illustrating a state in which a second engaging protrusion is engaged with a joining portion.

As illustrated in FIG. 6, for example, in the state where each of the hook portions 31 is hooked on its associated one of the hook protrusions 40, each of the hook protrusions 40 may rotate with a part where each of the hook portions 31 and the first engaging protrusion 42 are engaged as a rotation center in such a manner that each of the hook protrusions 40 collapses into the hook hole 35. Even in this case, the second engaging protrusion 43 is engaged with the joining portion 32. As a result, even if each of the hook protrusions 40 rotates with the part where each of the hook portions 31 and the first engaging protrusion 42 are engaged as the rotation center in such a manner that each of the hook protrusions 40 collapses into the hook hole 35, coming off of each of the hook protrusions 40 through the hook hole 35 may be avoided. As a result, it is difficult for each of the hook portions 31 to come off from its associated one of the hook protrusions 40.

Effects of Embodiment

The above embodiment offers the following effects.

(1) Each of the hook protrusions 40 includes the protrusion body 41, the first engaging protrusion 42 protruding from the distal end of the protrusion body 41 toward the tip of its associated one of the hook portions 31 in the extending direction, and the second engaging protrusion 43 protruding from the distal end of the protrusion body 41 in a direction opposite to the distal end of its associated one of the hook portions 31 in the extending direction. For example, in the state where each of the hook portions 31 is hooked on its associated one of the hook protrusions 40, the tip portion of each of the hook portions 31 may move in a direction away from the outer surface of the cover body 13. Even in this case, the first engaging protrusion 42 is engaged with the tip portion of each of the hook portions 31. As a result, coming off of each of the hook portions 31 from its associated one of the hook protrusions 40 may be avoided. In addition, for example, in the state where each of the hook portions 31 is hooked on its associated one of the hook protrusions 40, each of the hook protrusions 40 may rotate with the part where each of the hook portions 31 and the first engaging protrusion 42 are engaged as the rotation center in such a manner that each of the hook protrusions 40 collapses into the hook hole 35. Even in this case, the second engaging protrusion 43 is engaged with the joining portion 32. As a result, coming off of each of the hook protrusions 40 through the hook hole 35 may be avoided, even if each of the hook protrusions 40 may rotate with the part where each of the hook portions 31 and the first engaging protrusion 42 are engaged as the rotation center in such a manner that each of the hook protrusions 40 collapses into the hook hole 35. Since the configuration makes coming off of the hook portions 31 from the hook protrusions 40 difficult, the reliability of the soundproofing cover 10 may be increased.

(2) For example, in hooking each of the hook portions 31 on its associated one of the hook protrusions 40, the joining portion 32 is hooked on the second engaging surface 43*c* of the second engaging protrusion 43 and then each of the hook protrusions 40 is inserted to the hook hole 35. The tip portion of each of the hook portions 31 is disposed between the first engaging surface 42*c* of the first engaging protrusion 42 and the outer surface of the cover body 13. This allows each of the hook portions 31 to be hooked on its associated one of the hook protrusions 40 stably. At this time, the second engaging surface 43*c* of the second engaging protrusion 43 is disposed at a position farther from the proximal end of the protrusion body 41 than the first engaging surface 42*c* of the first engaging protrusion 42. As a result, a workspace for hooking the joining portion 32 on the second engaging surface 43*c* may be easily secured, so that the joining portion 32 may be easily hooked on the second engaging surface 43*c*. Thus, hooking each of the hook portions 31 on its associated one of the hook protrusions 40 may be performed easily.

Modification

The above embodiment may be modified as exemplified below. The above embodiment and the following modifications may be combined within a technically consistent range.

Figure 7:
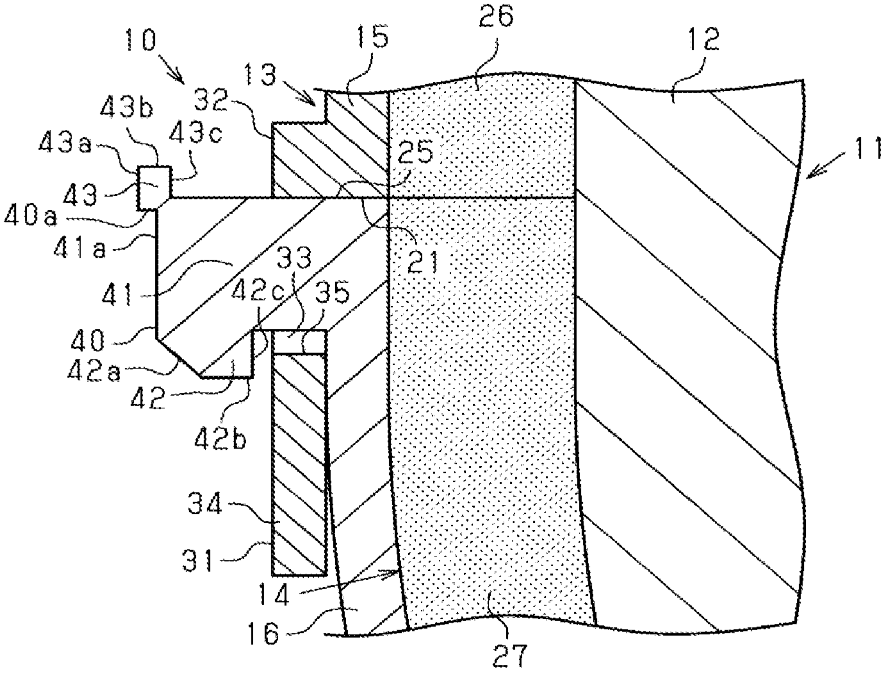
FIG. 7 is a cross-sectional view illustrating a relationship between a hook portion and a hook protrusion according to a modification.

As illustrated in FIG. 7, the second engaging protrusion 43 may partially protrude from the distal end surface 41*a* positioned on the distal end of the protrusion body 41 in the protruding direction thereof, and also protrude from the protrusion body 41 in a direction opposite to the tip of its associated one of the hook portions 31 in the extending direction thereof. The hook protrusions 40 each have a stepped surface 40*a*. The stepped surface 40*a* protrudes from the distal end surface 41*a* of the protrusion body 41 in the protruding direction of the protrusion body 41. The stepped surface 40*a* connects the distal end surface 41*a* of the protrusion body 41 and the flat surface 43*a* of the second engaging protrusion 43. A portion of the second engaging protrusion 43 protrudes from the distal end surface 41*a* of the protrusion body 41 by an amount of protrusion of the stepped surface 40*a*.

This configuration allows the second engaging surface 43*c* of the second engaging protrusion 43 to be positioned as far as possible from the proximal end of the protrusion body 41 as compared with the first engaging surface 42*c* of the first engaging protrusion 42 while securing the thickness of the second engaging protrusion 43 as much as possible. Therefore, in hooking each of the hook portions 31 on its associated one of the hook protrusions 40, a workspace for hooking the joining portion 32 to the second engaging surface 43*c* may be more easily secured, so that the joining portion 32 may be more easily hooked on the second engaging surface 43*c*. As a result, hooking each of the hook portions 31 on its associated one of the hook protrusions 40 may be performed more easily.

Figure 8:
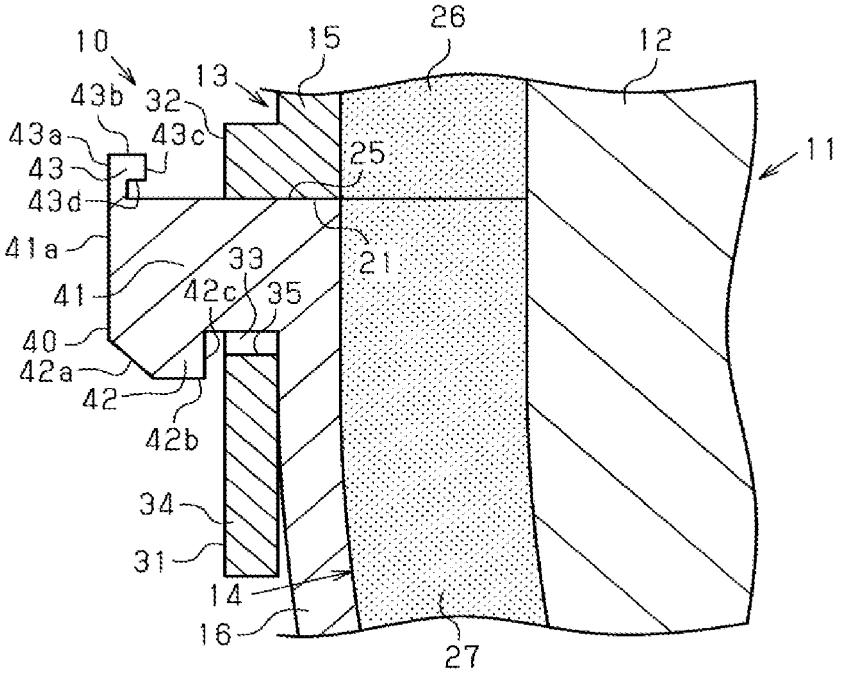
FIG. 8 is a cross-sectional view illustrating a relationship between a hook portion and a hook protrusion according to a modification.

As illustrated in FIG. 8, the second engaging surface 43*c* may have a recess 43*d*. The recess 43*d* is continuous with the protrusion body 41. This configuration allows the joining portion 32 to be hooked on the second engaging surface 43*c* of the second engaging protrusion 43 while making the joining portion 32 enter the recess 43*d* in hooking each of the hook portions 31 on its associated one of the hook protrusions 40. Therefore, in hooking each of the hook portions 31 on its associated one of the hook protrusions 40, the joining portion 32 may be more easily hooked on the second engaging surface 43*c*. As a result, hooking each of the hook portions 31 on its associated one of the hook protrusions 40 may be performed more easily.

Figure 9:
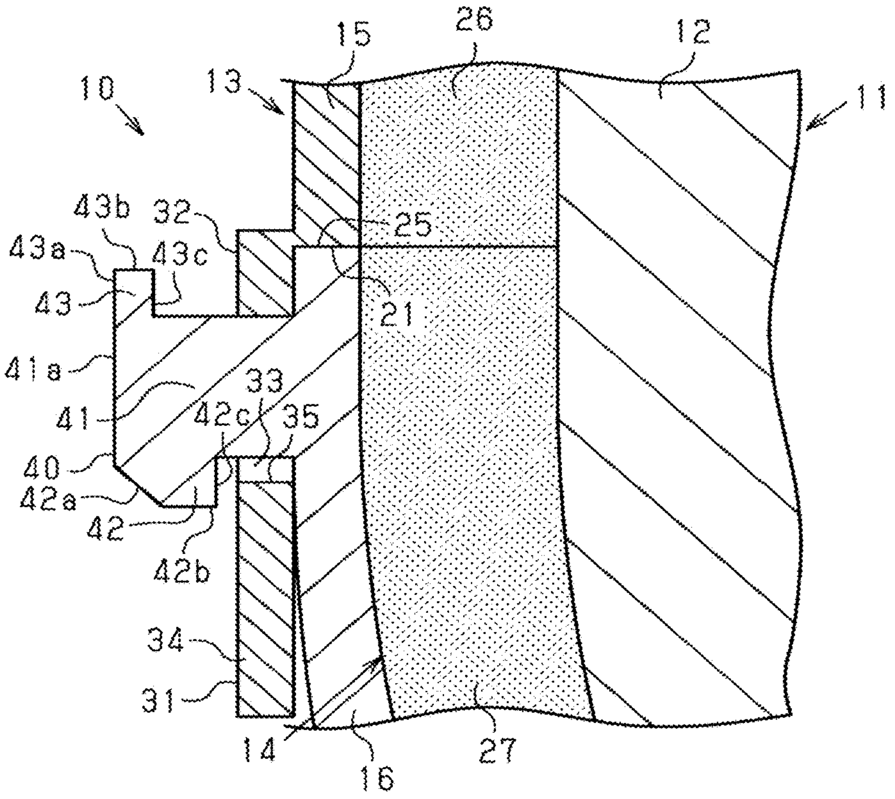
FIG. 9 is a cross-sectional view illustrating a relationship between a hook portion and a hook protrusion according to a modification.

As illustrated in FIG. 9, the protrusion body 41 may protrude from a portion of the outer surface of the second cover forming member 16 away from the second opening edge 25. In short, the hook protrusions 40 each may protrude from a portion of the outer surface of the cover body 13 away from the cover edge. For example, in the state where each of the hook portions 31 is hooked on its associated one of the hook protrusions 40, each of the hook protrusions 40 may rotate with the part where each of the hook portions 31 and the first engaging protrusion 42 are engaged as the rotation center in such a manner that each of the hook protrusions 40 collapses into the hook hole 35. In such a case, a portion of the cover body 13 closer to the cover edge than the hook protrusions 40 is supported by the sound absorber 14, which is a member disposed inside the cover body 13. This configuration suppresses rotation of each of the hook protrusions 40 with the part where each of the hook portions 31 and the first engaging protrusion 42 are engaged as the rotation center in such a manner that each of the hook protrusions 40 collapses into the hook hole 35. As a result, coming off of each of the hook protrusions 40 through the hook hole 35 may be easily avoided.

Figure 10:
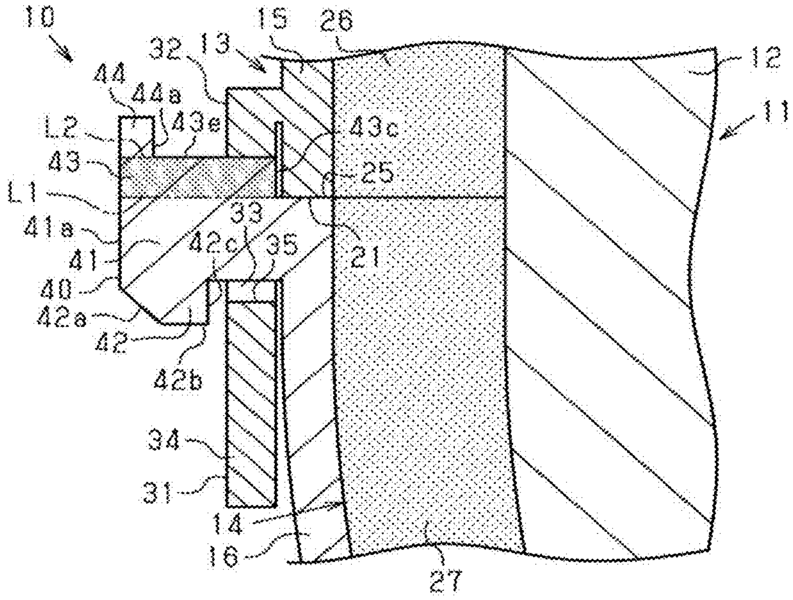
FIG. 10 is a cross-sectional view illustrating a relationship between a hook portion and a hook protrusion according to a modification.

As illustrated in FIG. 10, the protrusion body 41 protrudes from a portion of the outer surface of the second cover forming member 16 that includes the second opening edge 25. In the state where each of the hook portions 31 is hooked on its associated one of the hook protrusions 40, the second engaging protrusion 43 may protrude from the protrusion body 41 farther than the second opening edge 25 in a direction opposite to the tip of its associated one of the hook portions 31 in the extending direction thereof. In the state where each of the hook portions 31 is hooked on its associated one of the hook protrusions 40, a portion of the second engaging protrusion 43 close to the proximal end of the protrusion body 41 is positioned inside the hook hole 35. Therefore, the second engaging surface 43*c* of the second engaging protrusion 43 is disposed at a position closer to the proximal end of the protrusion body 41 than the first engaging surface 42*c*.

In the state where each of the hook portions 31 is hooked on its associated one of the hook protrusions 40, a portion of the first cover forming member 15 forming the first opening edge 21 faces the second engaging surface 43*c* in the protruding direction of the protrusion body 41. A portion of a surface 43*e* of the second engaging protrusion 43 opposite to the protrusion body 41 positioned inside the hook hole 35 faces the joining portion 32. A boundary between the protrusion body 41 and the second engaging protrusion 43 is positioned on an imaginary plane L1 passing the second opening edge 25.

Furthermore, each of the hook protrusions 40 may further include a protruding portion 44. In the state where each of the hook portions 31 is hooked to its associated one of the hook protrusions 40, the protruding portion 44 protrudes from the second engaging protrusion 43 in a direction opposite to the tip of its associated one of the hook portions 31 in the extending direction. The protruding portion 44 protrudes from an end of the second engaging protrusion 43 opposite to the proximal end of the protrusion body 41 in a direction opposite to the first engaging protrusion 42.

The protruding portion 44 has a third engaging surface 44*a* on a side of the proximal end of the protrusion body 41. The third engaging surface 44*a* is disposed at a position farther from the proximal end of the protrusion body 41 than the first engaging surface 42*c*. A boundary between the second engaging protrusion 43 and the protruding portion 44 is positioned on an imaginary plane L2 passing a surface 43*e* of the second engaging protrusion 43 opposite to the protrusion body 41. It is noted that the second engaging protrusion 43 is shown by dot hatching in FIG. 10. The second engaging protrusion 43 is a portion of each of the hook protrusions 40 positioned between the imaginary plane L1, the imaginary plane L2, and the surface 43*e*.

For example, in a state where the cover body 13 is closed with each of the hook portions 31 hooked to its associated one of the hook protrusions 40, a portion of the first cover forming member 15 forming the first opening edge 21 abut to the second opening edge 25 of the second cover forming member 16 may move in the protruding direction of the protrusion body 41. Then, each of the hook portions 31 may also move toward the first engaging protrusion 42. In the state where each of the hook portions 31 is hooked on its associated one of the hook protrusions 40, the second engaging protrusion 43 protrudes from the protrusion body 41 farther than the second opening edge 25 in a direction opposite to the tip of its associated one of the hook portions 31 in the extending direction thereof. Thus, the second engaging surface 43*c* is disposed at a position closer to the proximal end of the protrusion body 41 than the first engaging surface 42*c*. Therefore, the portion of the first cover forming member 15 forming the first opening edge 21 is engaged with the second engaging surface 43*c*. As a result, even if each of the hook portions 31 moves toward the first engaging protrusion 42 and is placed in contact with the first engaging protrusion 42, a load applied to the first engaging protrusion 42 from each of the hook portions 31 may be suppressed. Since the configuration makes coming off of the hook portions 31 from the hook protrusions 40 difficult, the reliability of the soundproofing cover 10 may be increased.

For example, in hooking each of the hook portions 31 to its associated one of the hook protrusions 40, the joining portion 32 is hooked to the third engaging surface 44*a* of the protruding portion 44 and, then, each of the hook protrusions 40 is inserted to the hook hole 35. The distal end of each of the hook portions 31 is disposed between the first engaging surface 42*c* of the first engaging protrusion 42 and the outer surface of the cover body 13. This allows each of the hook portions 31 to be engaged with its associated one of the hook protrusions 40 stably. At this time, the third engaging surface 44*a* of the protruding portion 44 is disposed at a position farther from the proximal end of the protrusion body 41 than the first engaging surface 42*c* of the first engaging protrusion 42. As a result, a workspace for hooking the joining portion 32 to the third engaging surface 44*a* may be easily secured, so that the joining portion 32 may be easily hooked to the third engaging 44*a*. Therefore, hooking each of the hook portions 31 to its associated one of the hook protrusions 40 may be performed easily.

In the embodiment, for example, the first engaging surface 42*c* and the second engaging surface 43*c* may be disposed at positions separated by the same distance from the proximal end of the protrusion body 41.

In the embodiment, for example, the second engaging surface 43*c* may be positioned closer to the proximal end of the protrusion body 41 than the first engaging surface 42*c* is.

In the embodiment, in hooking each of the hook portions 31 on its associated one of the hook protrusions 40, each of the hook protrusions 40 is inserted to the hook hole 35 without hooking the joining portion 32 to the second engaging surface 43*c* of the second engaging protrusion 43.

In the embodiment, the number of the hook portions 31 may be changed as necessary. In this case, the number of the hook protrusions 40 is appropriately changed so as to correspond to the number of the hook portions 31. In short, the hook protrusions 40 only have to protrude from the outer surface of the cover body 13 when the cover body 13 is in the closed state.

In the embodiment, the hook hole 35 does not have to have a square hole shape, and the shape of the hook hole 35 is not particularly limited.

In the embodiment, the protrusion body 41 does not have to have a quadrangular column shape, and the shape of the protrusion body 41 is not particularly limited.

In the embodiment, the cover body 13 does not have to include the hinge 17. In such a case, the soundproofing cover 10 may have a structure, for example, in which the first cover forming member 15 and the second cover forming member 16, both having a semicylindrical shape, are combined. The soundproofing cover may have a structure in which the cover body 13 made of a single strip of a thin sheet is wound around the housing 12 of the compressor 11 all the way around to cover the housing 12. In short, the soundproofing cover 10 only has to be a cover in which the cover body 13 is configured to be opened and closed and is maintained in the closed state with the each of the hook portions 31 hooked on its associated one of the hook protrusions 40.

In the embodiment, the soundproofing cover 10 does not have to include the sound absorber 14.

Although the soundproofing cover 10 is attached to the compressor 11 including the housing 12 having a cylindrical shape in the embodiment, the present invention is not limited thereto. An attaching target to which the soundproofing cover 10 is attached is not particularly limited.

The above embodiment includes the configuration described in the following additional notes.

[Additional Note 1]

1. A soundproofing cover comprising:
- a cover body configured to be opened and closed;
- a hook portion extending from the cover body and defining a hook hole; and
- a hook protrusion protruding from an outer surface of the cover body when the cover body is in a closed state and on which the hook portion is hooked with the hook protrusion inserted into the hook hole,
- the cover body being maintained in the closed state with the hook portion hooked on the hook protrusion, wherein
- the hook protrusion includes:
  - a protrusion body protruding from the outer surface of the cover body;
  - a first engaging protrusion protruding from a distal end of the protrusion body toward a tip of the hook portion in an extending direction of the hook portion with the hook portion hooked on the hook protrusion; and
  - a second engaging protrusion protruding from the protrusion body in a direction opposite to the tip of the hook portion in the extending direction with the hook portion hooked on the hook protrusion.

[Additional Note 2]

The soundproofing cover according to [Additional note 1], wherein
- the first engaging protrusion includes a first engaging surface positioned on a side of a proximal end of the protrusion body,
- a second engaging protrusion includes a second engaging surface positioned on the side of the proximal end of the protrusion body, and
- the second engaging surface is disposed at a position further from the proximal end of the protrusion body than the first engaging surface.

[Additional Note 3]

The soundproofing cover according to [Additional note 2], wherein the second engaging protrusion partially protrudes from a distal end surface positioned on a distal end of the protrusion body in a protruding direction of the protrusion body, and protrudes from the protrusion body in the direction opposite to the tip of the hook portion in the extending direction.

[Additional Note 4]

The soundproofing cover according to [Additional note 2] or [Additional note 3], the second engaging surface has a recess continuous with the protrusion body.

[Additional Note 5]

The soundproofing cover according to any one of [Additional note 1] to

[Additional Note 4], wherein
- the cover body has a cover edge that is an opening edge of the cover body when the cover body is in an opened state, and
- the hook protrusion protrudes from a portion the outer surface of the cover body away from the cover edge.

[Additional Note 6]

The soundproofing cover according to [Additional note 1], wherein
- the cover body has a cover edge that is an opening edge of the cover body when the cover body is in an opened state,
- the hook protrusion protrudes from a portion of the outer surface of the cover body that includes the cover edge,
- the second engaging protrusion protrudes from the protrusion body farther than the cover edge in the direction opposite to the tip of hook portion in the extending direction with the hook portion hooked to the hook protrusion,
- the first engaging protrusion includes a first engaging surface positioned on a side of a proximal end of the protrusion body,
- the second engaging protrusion includes a second engaging surface positioned on the side of the proximal end of the protrusion body, and
- the second engaging surface is disposed at a position closer to the proximal end of the protrusion body than the first engaging surface.

[Additional Note 7]

The soundproofing cover according to [Additional note 6], wherein the hook protrusion further include a protruding portion protruding from the second engaging protrusion in the direction opposite to the tip of the hook portion in the extending direction with the hook portion hooked on the hook protrusion, the protruding portion includes a third engaging surface positioned on the side of the proximal end of the protrusion body, and the third engaging surface is disposed at a position farther from the proximal end of the protrusion body than the first engaging surface.

What is claimed is:

1. A soundproofing cover comprising:

a cover body configured to be opened and closed;

a hook portion extending from the cover body and defining a hook hole; and a hook protrusion protruding from an outer surface of the cover body when the cover body is in a closed state, and on which the hook portion is hooked with the hook protrusion inserted into the hook hole, the cover body being maintained in the closed state with the hook portion hooked on the hook protrusion, wherein the hook protrusion includes:

a protrusion body protruding outwardly from the outer surface of the cover body;

a first engaging protrusion protruding from a distal end of the protrusion body in a protruding direction of the protrusion body toward a tip of the hook portion in an extending direction of the hook portion with the hook portion hooked on the hook protrusion; and a second engaging protrusion protruding from the distal end of the protrusion body toward a direction opposite to the first engaging protrusion in the extending direction with the hook portion hooked on the hook protrusion.

2. The soundproofing cover according to claim 1, wherein the first engaging protrusion includes a first engaging surface positioned on a side of a proximal end of the protrusion body, the second engaging protrusion includes a second engaging surface positioned on the side of the proximal end of the protrusion body, and the second engaging surface is disposed at a position farther from the proximal end of the protrusion body than the first engaging surface.

3. The soundproofing cover according to claim 2, wherein the second engaging protrusion partially protrudes from a distal end surface positioned on the distal end of the protrusion body in the protruding direction of the protrusion body, and protrudes from the protrusion body in the direction opposite to the tip of the hook portion in the extending direction of the hook portion.

4. The soundproofing cover according to claim 2, wherein the second engaging surface has a recess continuous with the protrusion body.

5. The soundproofing cover according to claim 1, wherein the cover body has a cover edge that is an opening edge of the cover body when the cover body is in an opened state, and the hook protrusion protrudes from a portion of the outer surface of the cover body away from the cover edge.

6. The soundproofing cover according to claim 1, wherein the cover body has a cover edge that is an opening edge of the cover body when the cover body is in an opened state, the hook protrusion protrudes from a portion of the outer surface of the cover body that includes the cover edge, the second engaging protrusion protrudes from the protrusion body farther than the cover edge in the direction opposite to the tip of hook portion in the extending direction with the hook portion hooked to the hook protrusion, the first engaging protrusion includes a first engaging surface positioned on a side of a proximal end of the protrusion body, the second engaging protrusion includes a second engaging surface positioned on the side of the proximal end of the protrusion body, and the second engaging surface is disposed at a position closer to the proximal end of the protrusion body than the first engaging surface.

7. The soundproofing cover according to claim 6, wherein the hook protrusion further include a protruding portion protruding from the second engaging protrusion in the direction opposite to the tip of the hook portion in the extending direction with the hook portion hooked on the hook protrusion, the protruding portion includes a third engaging surface positioned on the side of the proximal end of the protrusion body, and the third engaging surface is disposed at a position farther from the proximal end of the protrusion body than the first engaging surface.

* * * * *